Dec. 11, 1962 KICHIRO SATO 3,067,647
SUBJECTIVE OPTOMETER
Filed Oct. 28, 1958 3 Sheets-Sheet 1
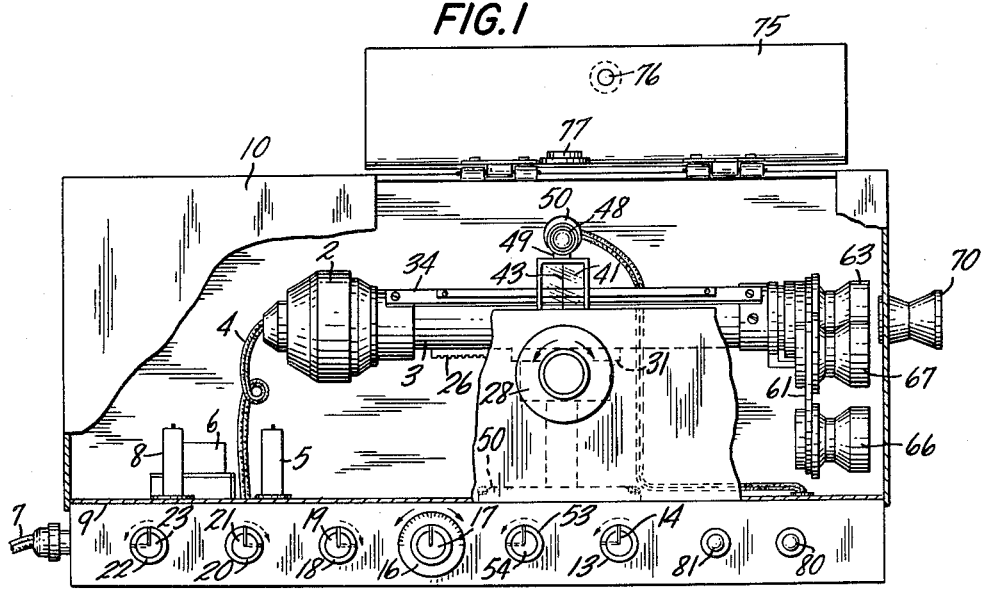
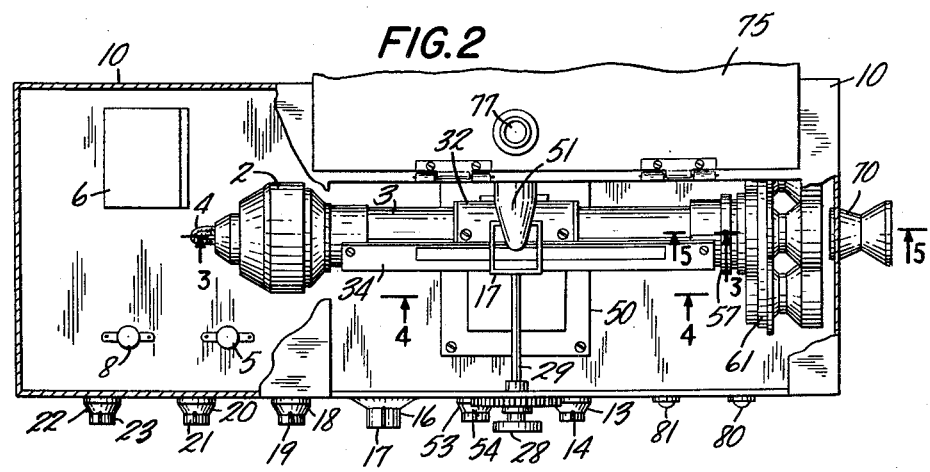
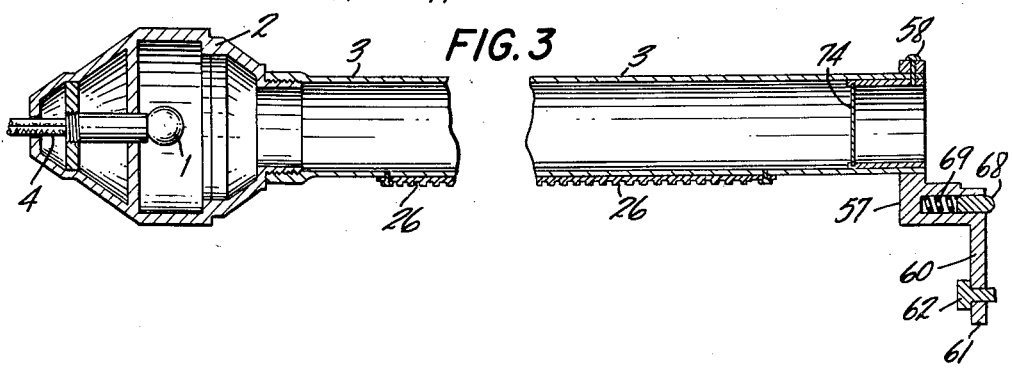

Dec. 11, 1962 KICHIRO SATO 3,067,647
SUBJECTIVE OPTOMETER
Filed Oct. 28, 1958 3 Sheets-Sheet 2
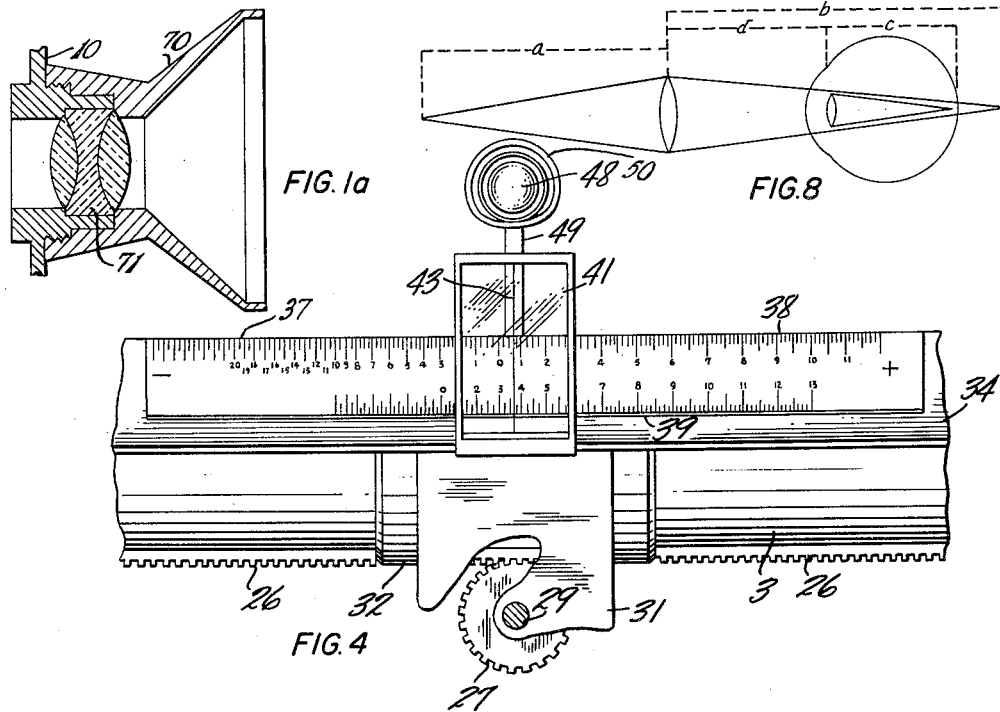
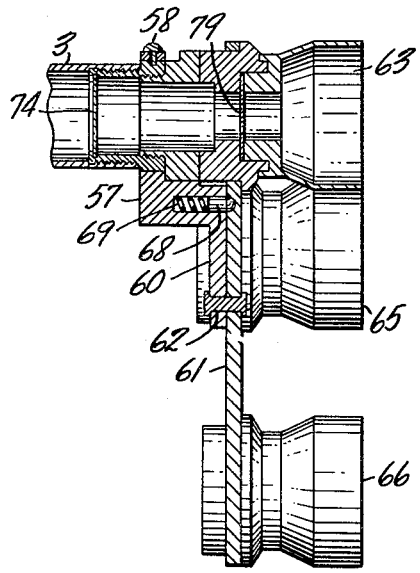
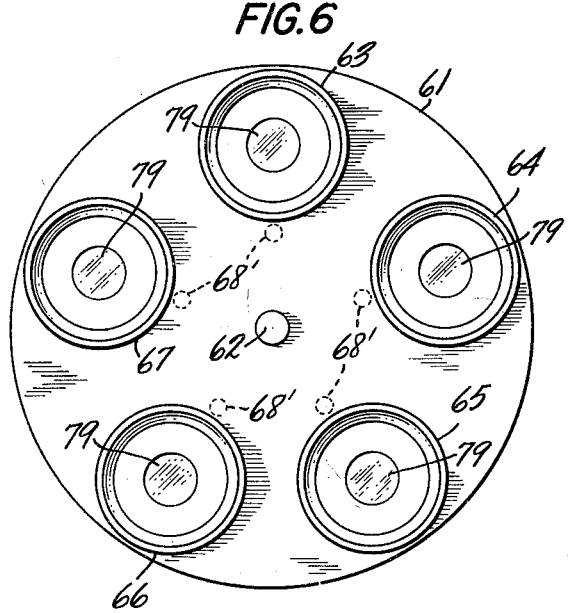

Dec. 11, 1962  KICHIRO SATO  3,067,647
SUBJECTIVE OPTOMETER
Filed Oct. 28, 1958  3 Sheets-Sheet 3

United States Patent Office 3,067,647
Patented Dec. 11, 1962

3,067,647
SUBJECTIVE OPTOMETER
Kichiro Sato, 30 Uchisange, Okayama City,
Okayama, Japan
Filed Oct. 28, 1958, Ser. No. 770,065
2 Claims. (Cl. 88—20)

This invention relates generally to dioptrics and more particularly to an improved subjective optometer for examination of myopia, hyperopia and astigmatism.

A feature of the invention is that the examinee may use the subjective optometer for examining his own eyes by viewing test objects in conjunction with a collimating cylinder by axial adjustment of the cylinder with reference to a stationary lens so that the diopters are indicated on scales movable jointly with the cylinder and read on an indicator line.

Other features and advantages of the subjective optometer in accordance with the present invention will be better understood as described in the following specification and appended claims, in conjunction with the following drawing, in which:

FIG. 1 is a side elevation view partly cut away, illustrating an optometer according to the invention;

FIG. 1a is a sectional view on an enlarged scale of an eyepiece in the optometer illustrated in FIG. 1;

FIG. 2 is a fragmentary plan view partly in section of the optometer illustrated in FIG. 1;

FIG. 3 is a section on an enlarged scale taken at line 3—3 of FIG. 2;

FIG. 4 is a section on an enlarged scale taken at line 4—4 of FIG. 2;

FIG. 5 is a section on an enlarged scale taken on line 5—5 of FIG. 2;

FIG. 6 is an elevation view on an enlarged scale of a front portion of the optometer cylinder in FIG. 1;

FIG. 8 is a diagram for illustrating the principles of the invention.

Figure 7:
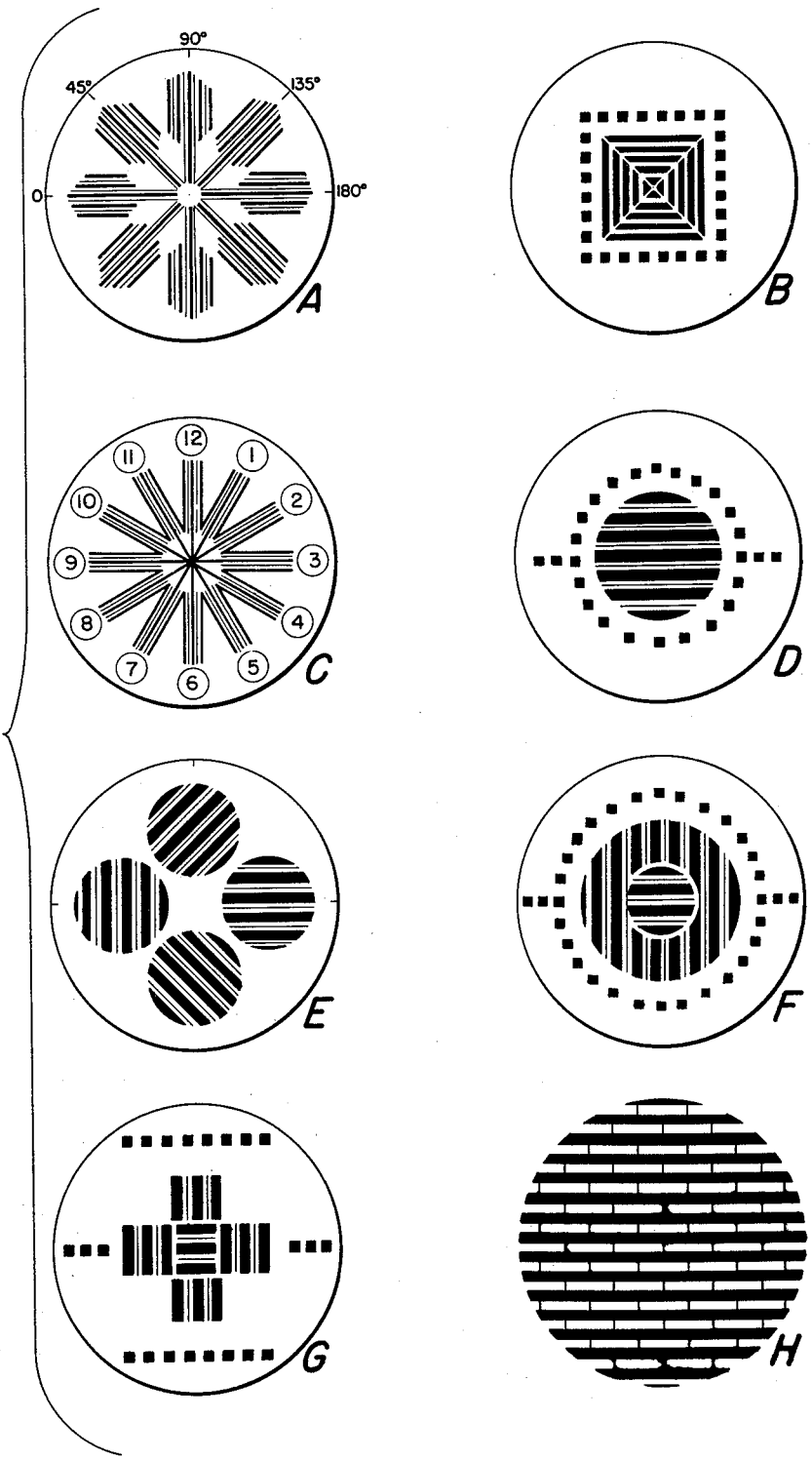
FIG. 7 is a diagrammatic view of a plurality of test objects viewable in the optometer according to the invention illustrated in FIG. 1.

Referring to the drawing the optometer illustrated comprises a source of light 1 mounted in an enlarged portion 2 of a collimating cylinder 3 capable of axial travel as hereinafter described. The source of light 1 is energized through a conductor 4 from a power source comprising a discharge tube 5 and a power transformer 6 connected to a supply lead 7 and a rectifier tube 8. The tube and the various component parts are mounted on a chassis 9, as illustrated, interiorly of a case 10.

The light source 1 is a flickering light source which is caused to flicker by a relay and circuitry not shown. The optometer power is turned on and off at a power switch 13 by actuation of a knob 14. The intensity of the lamp 1 is controlled at a calibrated rheostat 16 by turning a dial knob 17. The speed of flickering is adjustable by a switch 18 by rotating a knob 19. A switch 20 is provided with a knob 21 for stopping the flickering of the light source which leaves the aforementioned relay and circuitry, not shown, in condition for flickering the lamp if desired. A switch 22 having a knob 23 for turning off the lamp 1 is provided. It will be understood that the above-described switches are mounted externally of the optometer as illustrated in FIG. 2. Moreover, the circuitry for flicker, not shown, causing lamp 1 to flicker may be of any suitable design and forms no part of the invention herein.

The cylinder 3 is provided with a rack 26 and is mounted for axial travel in opposite directions under control of a pinion 27 connected to a rotary knob 28 disposed externally of the optometer having a rotary shaft 29 connected thereto and supported on a bearing support 31. A short sleeve 32 fixed to the support 31 supports the tube 3 so that it can be selectively positioned axially, through the gear and rack arrangement. A support 34 is mounted on the collimating tube 3 for supporting three scales 37, 38, 39 movable axially with the tube.

The optometer is provided with a stationary clear glass plate 41 mounted on the support 31 and having an indicator mark 43. The aforementioned scales traveling with the tube 3 are read by reading the graduations thereon in alignment with the indicator mark. In order to easily read the scales the optometer is provided with a lamp 48 mounted on a support 49 on a base 50 holding the lamp in position aligned with the glass 43. A shade 51 is disposed over the lamp. The lamp 48 is connected by a lead to a switch 53 having a knob 54 for turning on the lamp.

The forward end of the collimating tube 3 is provided with a collar 57 fixed onto the tube axially by set screws, for example set screw 58, and having an extension or arm 60 on which is pivotally mounted a disc 61 rotatable about a pivot 62. The disc 61 is provided with a plurality of holders 63–67 in each of which is mounted a respective test object or pattern designated A–H illustrated in FIG. 7 and illustrated in section in FIG. 5 in which the holder 63 mounts the test object A therein. The holders are aligned coaxially selectively and alternatively with the tube 3 by rotating the disc 61 into proper position for coaxial alignment therewith. The disc is held in the different aligned positions by a plurality of angularly spaced recesses 68' engageable by a bullet catch or latch 68 biased by a spring 69 in the collar 57.

Externally of the optometer and the case thereof is mounted an eyepiece 70 provided with a lens 71 having an optical axis coaxial with the tube 3 and having a fixed distance between it and the indicator mark 43 on the glass plate 41. The examinee in testing sites through the eyepiece and into the tube 3 for viewing the test objects A–H individually. The tube is provided with a frosted glass 74 so that the test objects will be readily viewed without glare.

On the upper part of the case of the optometer is provided a pivoted lid 75 having a knob 76 and a lock 77 providing access into the interior of the optometer and the mechanism heretofore described.

The scales 37–39 are graduated based on computations from the following formulae, where:

$D_1$ is the dioptry of the lens.
$D_2$ is the dioptry of the refraction of the eye.
$D_3$ is the dioptric correction of the myopic or hyperopic eye.
$a$ is measured in millimeters.
$b$ is measured in millimeters.
$c$ is the length of the eye axis.
$d$ is a distance between the center of the lens and the main point of the eye.

The total refraction of an eye is 58.64 diopters, according to Dr. Gullstrand. Assuming see FIG. 8, that the light is emitted from a point source and focused through a lens, for example, lens 71, a distance $a$ from the point source and having a focal distance $b$ and then focused on the retina of an eye through the eye a distance $d$ from the center of the lens of the axis of the eye having a length $c$ then we have:

$$\frac{1}{a} + \frac{1}{b} = D_1 \qquad (1)$$

where, $a$ and $b$ are measured in millimeters.

We have the following equation for an eye, $$\frac{1000}{d-b}+\frac{1000}{c}=D_2 \quad (2)$$

In case of parallel light and of no lens, $$D_3+\frac{1000}{c}=D_2 \quad (3)$$

From Equations 2 and 3, $$\frac{1000}{d-b}=D_3$$

$$\frac{1000}{D_3}=d-b$$

Therefore, $$b=d-\frac{1000}{D_3} \quad (4)$$

Substituting Equation 4 into Equation 1

$$\frac{1000}{a}+\frac{1000}{d-\frac{1000}{D_3}}=D_1$$

$$\frac{1000}{a}=D_1+\frac{1000}{d-\frac{1000}{D_3}}$$

$$=D_1+\frac{1000D_3}{dD_3-1000}$$

$$=\frac{1000(D_1+D_3)-dD_1D_3}{1000-dD_3}$$

Therefore, $$a=\frac{1000-dD_3}{1000(D_1+D_3)-dD_1D_3}\times 1000 \quad (5)$$

N.B.—We consider $a$ is positive when it is on the right or in front of the lens and $b$ is positive when it is at the back of the lens.

As the value of $c$ for the myopia is larger than that for the emmetropia, $$\frac{1000}{c}$$

is smaller than $D_2$ and accordingly $D_3>0$, while $$D_2-\frac{1000}{c}=D_3<0$$

for the hyperopia.

By the Equation 5 we get the length of interval of the scale, where $d=45.50$ mm., $D_1=14.89$ diopters.

In case of emmetropia, $$D_3=0$$

From Equation 5

$$a=\frac{1000\times 1000}{1000\times 14.89}=67.15 \text{ mm.}$$

In case of myopia, 1 diopter—

$$D_3=1$$

$$a=\frac{1000-45.50\times 1}{1000\times(14.89+1)-45.50\times 14.89\times 1}\times 1000$$
$$=62.75 \text{ mm.}$$

2 diopters—

$$D_3=2000$$

$$a=\frac{1000-45.50\times 2}{1000\times(14.89+2)-45.50\times 14.89\times 2}\times 1000$$

In the same way, $a=54.45$ mm. for 3 diopters
$a=50.59$ mm. for 4 diopters and so on.

In case of hyperopia 1 diopter—

$$D_3=1$$

$$a=\frac{1000+45.50\times 1}{1000\times(14.48-1)+45.50\times 14.89\times 1}\times 1000$$
$$=71.75 \text{ mm.}$$

10 diopters—

$$D_3=10$$

$$a=\frac{1000-45.50\times 10}{1000\times(14.89-10)+45.50\times 14.89\times 10}\times 1000$$
$$=124.57 \text{ mm.}$$

In the scale 37 the distance between graduations decreases as the distance from the zero point increases for examining for myopia. The scale 38 has the spacing between graduations increasing as the distance from zero increases. This scale is for the examination of hyperopia. The zero point between the scales indicates the punctum remotum of emmetropia. The scale 39 has the divisions thereon the scale as the hyperopia scale except that the zero point thereof coincides with the minus 3 diopters division or graduation for testing myopia. The scale 39 is for presbyopia.

The test objects A–H illustrated in FIG. 7 are mounted on respective transparent plates 79 and each figure is so designed as to make the determination of the axis in the direction of astigmatism quite readily.

In order to examine his sight and eyes an examinee closes the lid of the optometer and actuates the switch 13 and then actuates switch 53 to turn on the lamp 48 and adjusts the intensity of the flickering lamp in the tube by turning the rheostat. A green light 80 indicates the switch 13 is closed and a red light 81 indicates the lamp 1 is flickering. The adjustment of the flickering speed of the lamp is obtained by adjusting the knob 19 of the switch 18. The examinee then rotates the knob 28 and positions the tube 3 in the best position possible to obtain optimum definition of a test object that he is viewing. When the examinee finds that he views the test object at a certain point more distinctly than at other points while turning the knob 28 he leaves the cylinder in the adjusted position and the scales are then read through the indicator mark. The value indicated on the scale 37 aligned with the indicator mark tells the diopters of the examinee. For example, if the indicator line indicates that the value is +10 on the scale 37 then the examinee is hyperopic of 10 diopters and in case the value reads —8 the examinee is a myope of 8 diopters.

In order to examine the refraction of presbyopia the scale 39 is employed. As indicated heretofore the scale 39 is graduated so that minus 3 diopters on the scale is equal to the zero point of this scale. The punctum proximum of aged individuals in reading the scale may be presumed to be minus 3 diopters. The scale is read in the same manner through the aligned indicator mark and computations are made as heretofore.

In the event that the examinee is an astigmatic person he may be able to see some of the test objects distinctly but other elements thereof vaguely. For example, a person whose astigmatic axis is horizontal can see only the horizontal elements distinctly in a test object and the other elements vaguely and accordingly the astigmatic axis can be determined and at the same time the degree of astigmatism is indicated on the scale by the indicator mark.

Accordingly, according to the optometer of the present invention the diopters of an eye can be determined accurately and readily and correct eyeglasses for correcting visual defects may be readily selected.

While preferred embodiments of the present invention have been shown and described it will be understood that many modifications and changes can be made within the true spirit and scope of the invention.

What I claim and desire to secure by Letters Patent is:

1. In an optometer, in combination, a source of light, an elongated tube axially movable relative to said source of light, a stationary lens with its optical axis aligned with the longitudinal axis of said tube, an eyepiece for viewing through said tube and lens, a first scale on said tube and movable therewith for the examination of myopia having a zero point representative of a punctum remotum of emmetropia and graduations whose spacing decreases in a direction away from said zero point, a second scale movable with said tube for the examination of hyperopia having a common zero point with the first-mentioned zero point and whose graduations increase away from said zero point, and a fixed indicator line usable with the scale for reading the scales at a point aligned with said line, in operation said tube directing parallel light from said source through said lens focused at an anterior focal point $b$ of the lens and directed to the eye of an examinee viewing through said eyepiece of said tube and through said lens, means for selectively positioning test objects in alignment with the optical axis of said lens for viewing by said examinee when viewing through said tube for testing his eyes to determine date from said scales representative of data for correcting defects of sight, the intervals between graduations being determined according to the formula, $$a = \frac{1000 - dD_3}{1000(D_1 + D_3) - dD_1D_3} \times 1000$$

in which $a$ is the distance between said source which emits light and said lens, $D_1$ is the dioptry of the lens, $D_3$ is the dioptric correction of the myopic or hyperopic eye, $d$ is the distance between the center of said lens and the eye of the examinee when viewing through said tube, and said fixed indicator line being disposed intermediate said source of light and the eye of the examinee when the examinee views through said tube.

2. In an optometer, in combination, a source of light, an elongated tube axially movable relative to said source of light, a stationary lens with its optical axis aligned with the longitudinal axis of said tube, an eyepiece for viewing through said tube and lens, a first scale on said tube and movable therewith for the examination of myopia having a zero point representative of a punctum remotum of emmetropia and graduations whose spacing decreases in a direction away from said zero point, a second scale movable with said tube for the examination of hyperopia having a common zero point with the first-mentioned zero point and whose graduations increase in spacing in a direction opposite to the first-mentioned direction away from said zero point, a third scale movable with said tube for the examination of presbyopia having a zero point corresponding to a $-3$ diopters graduation on the first scale for examination of myopia, a fixed indicator line usable with the scales for reading the scales at a point aligned with said line, in operation said tube directing parallel light from said source through said lens focused at an anterior focal point $b$ of the lens and directed to the eye of an examinee viewing through said eyepiece of said tube and through said lens, means for selectively positioning test objects in alignment with the optical axis of said lens for viewing by said examinee when viewing through said tube for testing his eyes to determine data from said scales representative of data for correcting defects of sight, the intervals between graduations being determined according to the formula, $$a = \frac{1000 - dD_3}{1000(D_1 + D_3) - dD_1D_3} \times 1000$$

in which $a$ is the distance between said source which emits light and said lens, $D_1$ is the dioptry of the lens, $D^3$ is the dioptric correction of the myopic or hyperopic eye, $d$ is the distance between the center of said lens and the eye of the examinee when viewing through said tube, and said fixed indicator line being disposed intermediate said source of light and the eye of the examinee when the examinee views through said tube.

References Cited in the file of this patent

UNITED STATES PATENTS

| 871,103 | Bridge | Nov. 19, 1907 |
| 922,276 | Goodman | May 18, 1909 |
| 968,981 | Reese et al. | Aug. 30, 1910 |
| 1,727,411 | Ritholz | Sept. 10, 1929 |
| 2,057,983 | Spitler et al. | Oct. 20, 1936 |
| 2,495,708 | Draeger et al. | Jan. 31, 1950 |

OTHER REFERENCES

"Visual Optics," Emsley, second edition, 1939, published in London, England (pages 88–95 cited, pages 94 and 95 especially pertinent).